Dec. 22, 1953 A. L. SEGELHORST ET AL 2,663,192
LIQUID SAMPLING DEVICE
Filed Sept. 17, 1949

INVENTORS
August L. Segelhorst
Merrill F. Spurlock
BY:
ATTORNEYS

UNITED STATES PATENT OFFICE 2,663,192

LIQUID SAMPLING DEVICE

August L. Segelhorst, Taft, and Merrill F. Spurlock, Bakersfield, Calif.

Application September 17, 1949, Serial No. 116,284

3 Claims. (Cl. 73—421)

The present invention relates to liquid sampling devices and more particularly to liquid sampling devices for tanks, or storage vessels which contain a plurality of strata of different liquids, useful for obtaining a sample of the different liquids proportional to the total of each volume of liquid in the tank.

In the taking of a fluid sample from a storage tank or container in which a number of strata of different liquids are present, the greatest difficulty lies in introducing the sampling device into the storage vessel and admitting liquid into the sampler so that little or no intermixing of the various liquid strata occurs. Sampling devices of this type, known and used heretofore, have required considerable skill and knowledge on the part of the operator to obtain a true representative sample of the proportional volume of each of the different liquid strata due to the inherent intermixing action produced by the mechanical operation of these devices.

Broadly, the present invention comprehends a vertically disposed tube adapted to be lowered into a liquid volume or positioned within said volume and provided with means for opening a wall of the tube longitudinally throughout its length to permit a composite sample of the liquid to flow transversely into the tube, and means for maintaining the wall of the tube in a closed position both before and after the sample has been taken.

Further objects and advantages of the present invention will be apparent from the following detailed description taken in conjunction with the accompanying drawing, which forms a part of the specification.

Figure 1:
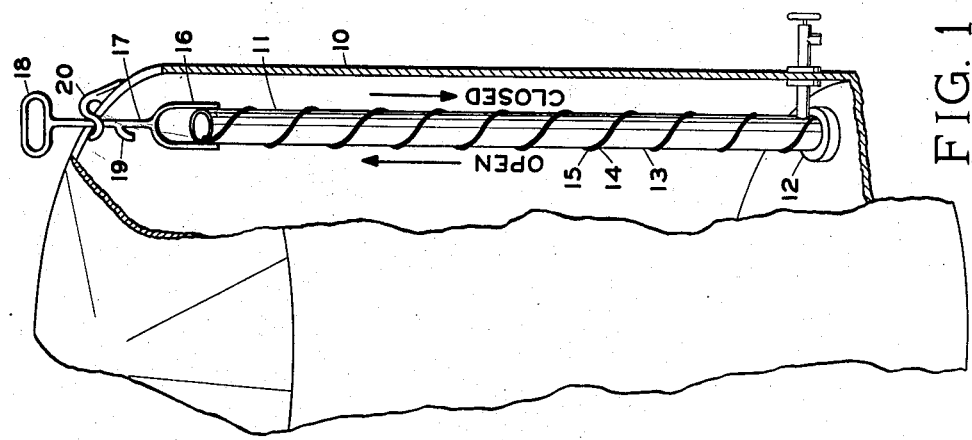
Fig. 1 is a perspective view of a liquid sampling device according to the present invention installed in a tank, or storage container, which is broken away to show the disposition of the device therein.

Referring now to the drawing, and in particular to Fig. 1, there is shown a storage tank, or vessel, 10, adapted to contain and store a particular liquid, such as crude oil, but which in addition to the desired crude oil liquid may contain other liquids, such as water-in-oil emulsions, sludge, and also salt water. These different liquids, due to their varying densities, will normally form stratified layers of the different liquids, and, in order to obtain a respresentative sample of the proportional volume of each of the liquids within the tank, a liquid sampling device, or tube, designated generally as 11, having a uniform cross-sectional area and of a length at least equal to the depth of the liquids in the tank, is vertically disposed within tank 10. Sampling device 11, in turn, is arranged to be seated on a base member 12, which may be of any suitable configuration to form a solid seating means on the bottom of tank 10.

Figure 3:
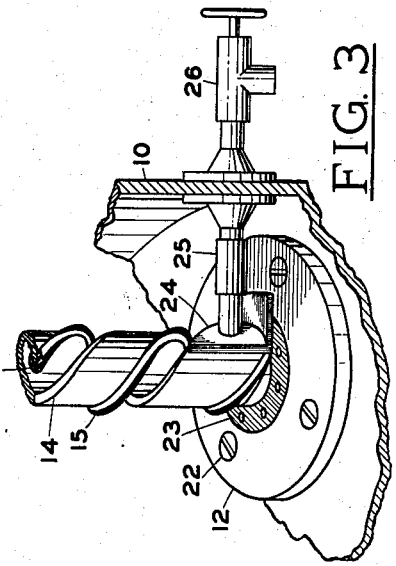
Fig. 3 is a perspective view of the lower portion of the liquid sampling device shown in Fig. 1, showing a conduit arrangement between the sampling device and the outside of the tank.
Figure 2:
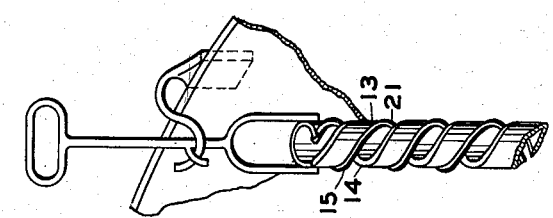
Fig. 2 is a perspective view of the upper portion of the embodiment shown in Fig. 1, showing the sampling device in an open position.

As shown, sampling device, or tube, 11 comprises a wall 13 which serves as an enclosing member for the sampling device 11 which, in the embodiment shown in Figs. 1, 2, and 3, is a helically wound strip of general cylindrical configuration, but which may be of square or elliptical cross-section, so long as the area of the tube is uniform throughout its length. In this embodiment it will be noted that wall 13 has a pair of edges 14 and 15 which extend substantially longitudinally throughout the length of the sampling device and which mate together to form an enclosed tube. In the present embodiment the wall 13 is preferably made of spring material, such as spring steel, and wound so that the edges 14 and 15 are normally biased to a closed position.

In order to provide the desired longitudinally extending slot, or slit, throughout the length of the sampling tube, lifting means such as bail 16 is welded to the upper portion of wall 13. The upper portion of bail 16 is provided with an extended rod 17 adapted to pass through the top of tank 10 and, in turn, is provided with a handle member 18. Rod 17 has a hook 19 formed along the length of the rod adapted to interconnect with a hook element 20 mounted near the top of tank 10 when handle 18 is lifted and turned. The interaction of hooks 19 and 20 is best seen in Fig. 2, wherein wall 13 has been expanded so that a longitudinal slot defined by the edges 14 and 15 of wall 13 is open to the interior of tank 10. As shown, edge 15 of wall member 13 is preferably provided with sealing means, such as rubber, or other sealing material which is inert to the liquids in the tank.

As best seen in Fig. 3, stationary base member 12 is preferably mounted on the bottom of tank 10 by suitable means, such as the three screws 22, and is provided with a sealing ring 23, upon which one end of tube 11 is seated. In the present arrangement, it will be noted that wall 13 is permanently fixed to base member 12 by means of an angle 24 which also provides an interconnection for conduit means 25 communicating between the interior of the liquid sampling device 11 and the outside of tank 10. It will be understood that angle 24 is permanently mounted on base 12 by welding or other suitable means. Valve means 26 is provided for the conduit means 25 in order to provide a closed or liquid retaining condition for the interior of the liquid sampling device.

Operation of this embodiment is as follows: When it is desired to obtain a sample of the liquid strata in tank 10, handle 18 is lifted and turned through an angle of 90 degrees so that hooks 19 and 20 are engaged as shown in Fig. 2. Under this condition, wall 13 of tube 11 is placed under tension, so that the slot defined by edges 14 and 15 will be opened throughout the length of the liquid sampling device so that the fluid may enter the interior of the tube. Since the device in this embodiment is arranged to be permanently fixed within the tank, there will be no intermixing of the various liquid strata by the introduction of the sampling device, and, due to the relatively small amount of displacement required in moving the tube from an opened to a closed position throughout its entire length, little or no mechanical mixing of the liquids will occur. After the liquid sample has been admitted to the interior of the liquid sampling device, the handle is again lifted to clear hook 19 from hook 20, and, due to the normal biasing force of the spring steel of which wall 13 is constructed, the tube will be returned to its normally closed position. The interior of the tube will be sealed against any intrusion of the tank fluid, as well as loss of the fluid sample to the tank, by the sealing action of sealing material 21 interacting between edges 14 and 15 of wall 13. After the liquid sampling device has been closed to the tank, the valve means 26 on conduit means 25 may be opened for the withdrawal of the volume within the sampling tube to a point outside the tank.

Figure 5:
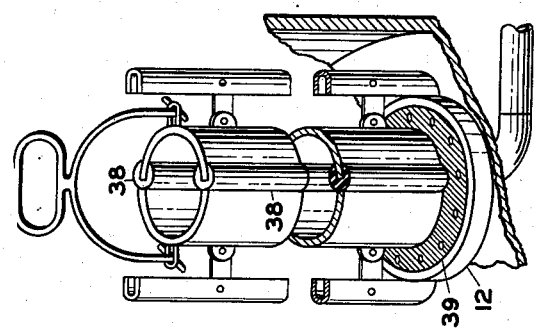
Fig. 5 is a perspective view similar to Fig. 4, showing the sampling device in closed position.
Figure 4:
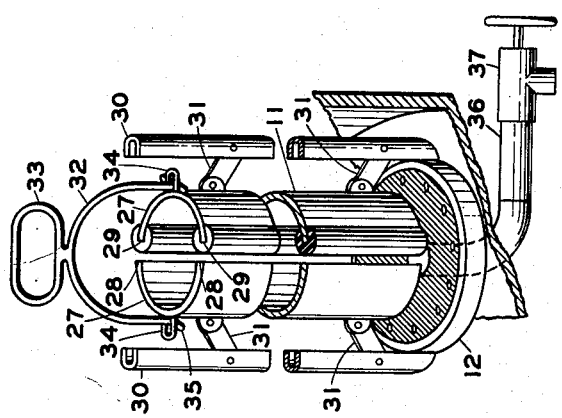
Fig. 4 is an alternative embodiment of the liquid sampling device, in accordance with the present invention, showing the liquid sampling device in opened position.

Referring now to the alternative embodiment shown in Figs. 4 and 5, liquid sampling device 11 in this example comprises a pair of elongated arcuate wall members 27 having a pair of edges 28 and 29 which are adapted to be moved relative to each other so that a longitudinal extending slot may be provided throughout the entire length of the sample tube 11. However, in this particular arrangement a pair of support means 30 parallel to the tube are provided for supporting hinge means, such as linkage elements 31, which are pivoted on support means 30. Linkage means 31 in turn provide a hinged connection for walls 27. While support means 30 may be mounted directly on tank 10, it is preferably arranged to engage base member 12 so that the tube 11 is in a centrally-disposed position when it is lowered to be seated upon base 12.

In order to provide the desired movement of walls 27, a bail means 32 having a lifting handle 33 and adapted to pass through a pair of loops 34 mounted on the outside edges of walls 27 is provided with a pair of cross-members 35. Cross-members 35 are adapted to engage loop members 34 and thereby lift wall members 37.

As shown, communication with the interior of tube 11 is provided by conduit means 36, which is in turn provided with valve means 37 for opening and closing conduit means 36. As best seen in Fig. 5, sealing means 38, such as rubber, or other resilient materials, is provided between the mating edges 28 and 29 of walls 27. In addition, a sealing means is provided for the lower end of tube 11 by a ring of resilient material 39 mounted upon base member 12.

In the operation of the embodiment shown in Figs. 4 and 5, it will be apparent that with the support means 30 engaging base member 12 as shown in Fig. 5, walls 27 will be biased into a normally closed position due to the weight of the tube so that the lower end of tube 11 is seated on the sealing ring 39. When it is desired to obtain a sample of the stratified liquids in tank 10, handle 33 is lifted, walls 27 are pivoted on linkage means 31 and thereby open the slots defined by edges 28 and 29 throughout the entire length of the tube 11. Due to the simultaneous opening of the longitudinal slot throughout the length, there will be little or no tendency for the stratified liquids to be intermixed during the opening and closing operation and, hence, a true, representative sample of the liquid may be obtained. After the sample has been admitted to the interior of tube 11, the handle is lowered, permitting the weight of the tube to bias the walls 27 into an engaging position so that the edges 28 and 29 are sealed by sealing means 38 and the lower end reseated on ring 39. Valve means 37 may then be opened to permit the taking of a sample through conduit means 36.

While modifications and changes will occur to those skilled in the art, such modifications and changes may be made without departing from the spirit and scope of the present invention, and we therefore intend to limit the invention only within the scope of the appended claims.

We claim:

1. A liquid sampling device for a tank having strata of different liquids comprising an elongated sampler tube having one end rigidly attached to the bottom of said tank, said tube comprising a resilient strip helically wound to form a cylindrical tube of uniform cross-sectional area throughout its length, the edges of the turns of said helix being biased to abutting relation when in normal position by the resilient characteristic of said strip, lifting means for applying tension to said strip to cause said turns to be spaced apart and admit a sample of said liquid strata, conduit means between the interior of said tube near the bottom thereof and the outside of said tank, and valve means for opening and closing said conduit means.

2. A liquid sampling device for a tank containing stratified liquids comprising a stationary base member secured to the bottom and adjacent the side of said tank, an elongated sampler tube having one end secured to said base member, said sampler tube comprising a resilient strip helically wound to form a tube of substantially uniform cross-sectional area throughout its length, the edges of said strip being biased to an abutting relationship by the resilient characteristic of said strip, lifting means secured to the upper end of said sampler tube for applying tension and rotation to said strip to cause said edges to be spaced apart for the admission of a liquid sample representative of the proportion of each liquid stratum to the total volume of liquid in said tank, conduit means connected between the interior of said tube adjacent said stationary base member and the outside of said tank, and valve means for opening and closing said conduit means.

3. A liquid sampling device for a storage tank containing liquids stratified into two or more layers comprising a stationary base member mounted on the bottom of said tank, a normally-closed elongated sampler tube having one end secured to said base member, said tube comprising a helically-wound strip of resilient material, said strip being wound to form the enclosing wall for said tube to provide a uniform cross-sectional area throughout the length of said tube within which a sample of the stratified layers of liquids in said tank may be enclosed in proportion to their percentage volume of the total liquid volume in said tank, the edges of said helically-wound strip being normally biased by the resiliency of said material to an abutting relationship throughout the length of the helix, lifting means connected to said strip adjacent the upper end of said sampler tube for displacing said edges of said helically-wound strip to an open position throughout the tube's length to admit liquid laterally from said tank into said sampler tube, sealing means between the opposed edges of said strip to prevent leakage between the interior of said tube and said tank when said edges are closed, conduit means between the enclosed portion of said sampler tube and the outside of said tank, and valve means for opening and closing said conduit means.

AUGUST L. SEGELHORST.
MERRILL F. SPURLOCK.

References Cited in the file of this patent

UNITED STATES PATENTS

| Number | Name | Date |
|---|---|---|
| 892,944 | Drawe | July 7, 1908 |
| 1,205,888 | Haas | Nov. 21, 1916 |
| 1,606,104 | Schlueter et al. | Nov. 9, 1926 |
| 1,739,731 | Osborne | Dec. 17, 1929 |
| 1,953,886 | McConnell | Apr. 3, 1934 |
| 2,004,568 | Carpinello | June 11, 1935 |
| 2,164,498 | Clark | July 4, 1939 |